US011489811B1

(12) United States Patent
Kfir et al.

(10) Patent No.: US 11,489,811 B1
(45) Date of Patent: Nov. 1, 2022

(54) ON-DEVICE PROTECTED DNS

(71) Applicant: Check Point Software Technologies Ltd., Tel Aviv (IL)

(72) Inventors: Barak Kfir, Givat Shmuel (IL); Eliyahu Hanokh Sandler, Bene Atarot (IL)

(73) Assignee: Check Point Software Technologies Ltd., Tel Aviv (IL)

( * ) Notice: Subject to any disclaimer, the term of this patent is extended or adjusted under 35 U.S.C. 154(b) by 0 days.

(21) Appl. No.: 17/462,418

(22) Filed: Aug. 31, 2021

(51) Int. Cl.
  *G06F 15/173* (2006.01)
  *H04L 61/5076* (2022.01)
  *H04L 9/40* (2022.01)
  *H04L 61/4511* (2022.01)

(52) U.S. Cl.
  CPC ...... *H04L 61/5076* (2022.05); *H04L 61/4511* (2022.05); *H04L 63/126* (2013.01)

(58) Field of Classification Search
  CPC ............... H04L 51/5076; H04L 63/126; H04L 51/4511; H04L 29/08072
  USPC ........................................ 709/220, 223, 227
  See application file for complete search history.

(56) References Cited

U.S. PATENT DOCUMENTS

| 8,260,914 | B1 * | 9/2012 | Ranjan .................... H04L 63/12 709/224 |
| 9,762,618 | B2 * | 9/2017 | Goldstein ............... H04L 63/20 |
| 10,911,487 | B2 | 2/2021 | Kfir et al. |
| 2007/0204341 | A1 * | 8/2007 | Rand ..................... H04L 51/212 726/22 |
| 2013/0198803 | A1 * | 8/2013 | Osterweil ........... H04L 63/1458 726/1 |
| 2013/0291086 | A1 * | 10/2013 | Pontillo .............. H04L 63/0823 726/10 |
| 2017/0279803 | A1 * | 9/2017 | Desai ..................... H04L 67/02 |
| 2017/0331859 | A1 * | 11/2017 | Bansal .................. H04L 63/029 |
| 2017/0332238 | A1 * | 11/2017 | Bansal .................. H04L 67/125 |
| 2017/0339193 | A1 * | 11/2017 | Goldstein ........... H04L 63/0236 |
| 2018/0302446 | A1 * | 10/2018 | Goldstein ............. H04L 61/304 |
| 2019/0281009 | A1 * | 9/2019 | Abley .................. H04L 63/126 |
| 2021/0092088 | A1 * | 3/2021 | Ramachandran ... H04L 63/1408 |

FOREIGN PATENT DOCUMENTS

| CA | 2983429 A1 * | 10/2016 | .......... G06F 21/566 |
| EP | 1459171 A2 * | 9/2004 | ....... H04L 29/12066 |

* cited by examiner

*Primary Examiner* — Khanh Q Dinh

(57) ABSTRACT

Methods and systems are provided for protecting DNS traffic locally on an electronic device (e.g., a smart phone) by capturing DNS traffic from network traffic transmitted from the device and ensuring the DNS traffic is routed to a trusted DNS server via a prescribed transmission protocol.

20 Claims, 3 Drawing Sheets

ON-DEVICE PROTECTED DNS

TECHNICAL FIELD

The present disclosure relates generally to protecting against network-based attacks on devices and more particularly to providing on-device protection against Domain Name System (DNS) based attacks.

BACKGROUND

Connected mobile devices (e.g., smart phones, tablets, etc.) are constantly exposed to cyber threats on the internet, and are especially vulnerable to spyware, botnets, phishing sites, and other threats.

Domain Name System (DNS) protocol is a fundamental protocol for any device connectivity. Unfortunately, in most cases this protocol works in clear text (e.g., UDP port 53) against the DNS server dynamically defined on the network that the device connected to (e.g., a Wi-Fi or cellular network). For this reason, the entire DNS query can be intercepted either by Man in the Middle or even by the network owner (e.g., an ISP using the information to create a user profile). The intercepted query can be used for personal advertising, to compromise the user privacy, etc. Furthermore, since the protocol is not protected, the protocol can be spoofed and used to point the user to connect to a malicious internet protocol (IP) address (i.e., instead the real requested domain's IP address).

SUMMARY

It is possible to protect against network-based attacks by inspecting all traffic to every application and web browser on a device (regardless of protocol), and intercepting and blocking malicious traffic. Using this traffic interception ability to grab an entire devices outbound DNS traffic, the DNS traffic may be redirected to a trusted DNS server (also referred to as a DNS proxy). That is, an application running on the device intercepts a DNS request and replaces the original DNS server on the request with a trusted DNS server (e.g., configured centrally by an administrator). This way, DNS requests from the device are served by a trusted DNS server and not by an arbitrary DNS server set on the current network that the device is connected to.

In addition to routing DNS traffic to a trusted DNS server, the application may ensure that DNS traffic is transmitted over HTTPS (DoH) or over TLS (DoT). Ensuring the protocol that DNS is transmitted over not only replaces the DNS server on the DNS query, but also ensures that DNS traffic is transmitted in a secure encrypted DNS protocol. For example, a new DNS query may be generated and routed to the trusted DNS server in the place of an unencrypted DNS query. This allows for the server to be verified and DNS traffic to be encrypted (e.g., keeping DNS traffic private and protected from spoofing).

The securing of the DNS traffic is performed on device (e.g., on the mobile device itself) as opposed to being performed on an external device (e.g., at the trusted DNS source) to protect against a third party intercepting an unencrypted DNS query from the device before the query reaches the trusted DNS source.

Routing DNS traffic to a trusted DNS server and transmitting DNS traffic in a secure encrypted protocol enhances the protection of all traffic on the device, regardless of the app running on the device and whether the app vendor took appropriate security manners or used an insecure DNS protocol.

The present disclosure provides methods and systems performed locally on an electronic device (e.g., a smart phone) for protecting DNS traffic by capturing DNS traffic from network traffic transmitted from the device, and ensuring that the DNS traffic is routed to a trusted DNS server via a prescribed transmission protocol. These methods and systems are cross-platform and may be performed on any electronic device regardless of operating system or application running on the device.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
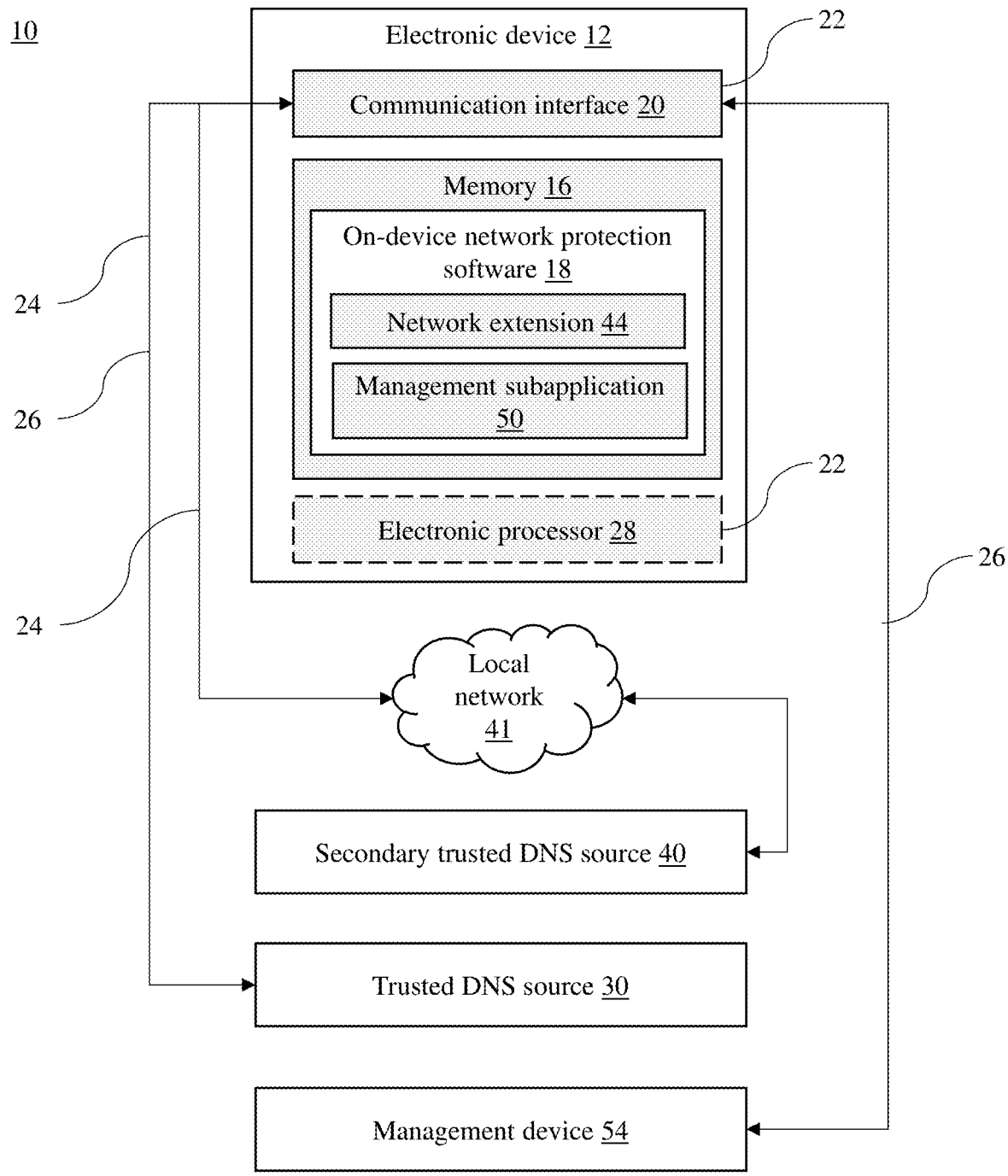
FIG. 1 is a block diagram of an embodiment of a system for securing DNS traffic included in network traffic.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides on-device network protection, by capturing DNS traffic from network traffic transmitted from the device and ensuring the DNS traffic is routed to a trusted DNS server via a prescribed transmission protocol. As described above, the DNS protection is performed on-device instead of using an external device. The protection is performed on-device to protect against a third party intercepting any DNS traffic between the device and the external device before the DNS traffic has been secured.

According to a general embodiment shown in FIG. 1, a system 10 for securing DNS traffic included in network traffic is presented. The system 10 includes an electronic device 12 that includes memory 16, on-device network protection software 18, and a communication interface 20. The on-device network protection software 18 is configured to be executed by circuitry 22. When executed by circuitry 22, the on-device network protection software 18 is configured to secure DNS traffic 24 included in network traffic 26 transmitted by the communication interface 20. The software 18 secures the DNS traffic 24 by intercepting the network traffic 26 before it is transmitted by the communication interface 20, analyzing the network traffic 26 to detect the DNS traffic 24, ensuring that the DNS traffic 24 is following a selected DNS protocol 28, and routing the DNS traffic 24 to a trusted DNS source 30. The circuitry 22 executing the software 18 may be included in at least one of the communication interface 20 or an electronic processor 28 (e.g., separate from the communication interface 20).

In one embodiment, ensuring that the DNS traffic 24 is following a selected DNS protocol 28 includes analyzing the DNS traffic 24 to identify DNS queries 32 of the DNS traffic 24. A current DNS protocol 33 is identified of each of the DNS queries 32. For each of the DNS queries 32 where the identified current DNS protocol 33 does not match the selected DNS protocol 28, the DNS query 32 is modified to follow the selected DNS protocol 28. For example, a new DNS query may be generated from the original DNS query (e.g., by reading the unencrypted data stored in the original DNS query and encrypting this data in the new DNS query). This new DNS query may then be sent in place of the original DNS query.

The selected DNS protocol 28 may be any suitable secure protocol, such as DNS over HTTPS (DoH) or DNS over TLS (DoT). The selected DNS protocol may be selected by an administrator of the electronic device 12, a user of the electronic device 12, or in any suitable manner.

Figure 2:
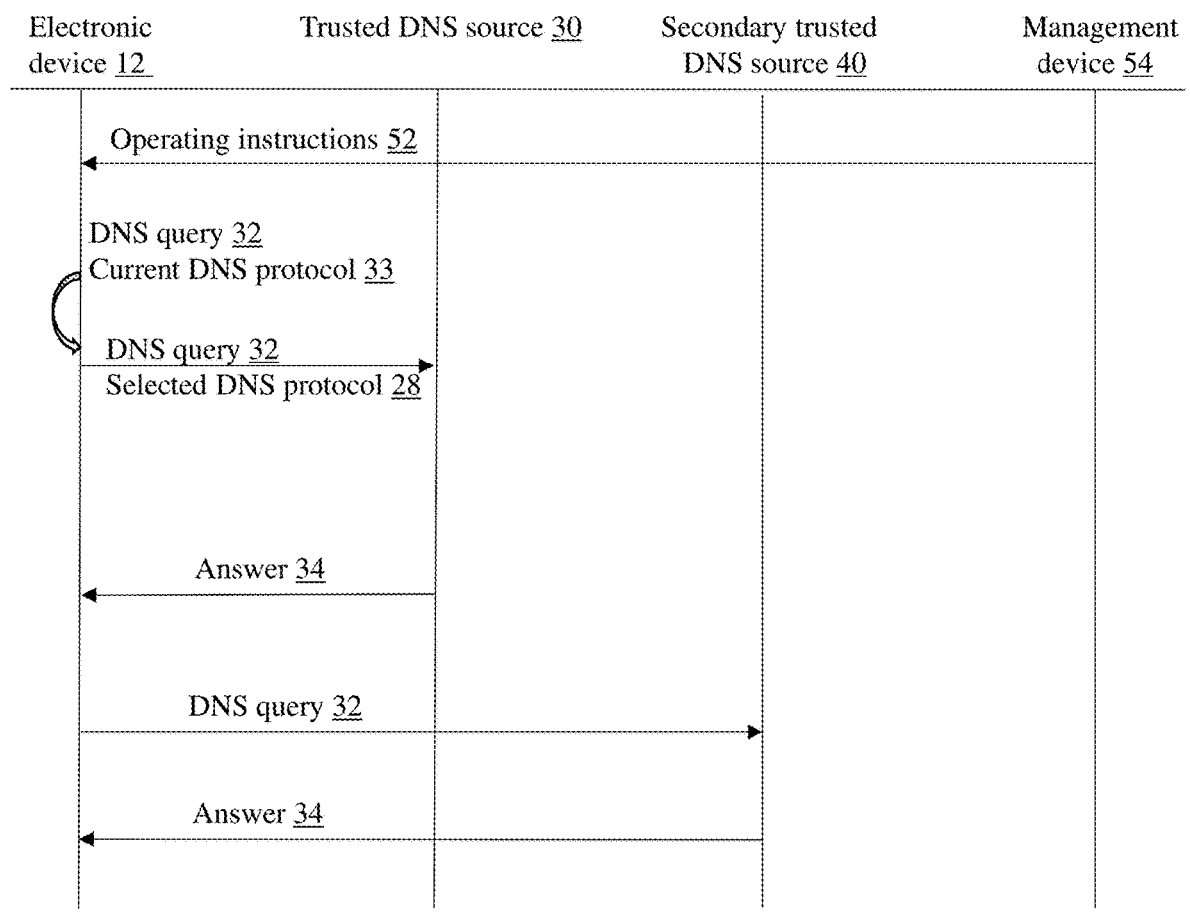
FIG. 2 is a ladder diagram showing communication in the system of FIG. 1.

In an embodiment shown in FIG. 2, the DNS traffic 24 includes at least one DNS query 32. Each of the DNS queries 32 is sent to the trusted DNS source 30 and an answer 34 is received by the trusted DNS source 30 in response to each of the DNS queries 32. The software 18 receives the answer 34 to each DNS query 32 and determines whether the answer 34 is a positive answer 36 or a negative answer 38. For example, if a DNS query 32 is for example.com, the trusted DNS source 30 may supply a positive answer including the IP address 93.184.216.34. Alternatively, if the DNS query 32 is for a local printer, the trusted DNS source 30 may supply a negative answer 38 indicating that an IP address was not found. When a negative answer is received, the software 18 may route the DNS query 32 associated with the negative answer to a secondary trusted DNS source 40. For example, the secondary trusted DNS source 40 may be a computer device located on a local network 41 (i.e., a local network that the electronic device is connected to) and functioning as a DNS server. The secondary trusted DNS source 40 may be any suitable computer device, such as a network router, server, etc. In this example, when the DNS query 32 for the local printer is sent to the secondary trusted DNS source 40, the secondary trusted DNS source 40 may return the IP address of the local printer as an answer 34.

In one embodiment, the software 18 includes a network extension 44 that is executed by or controlled by the communication interface 20 (also referred to as a network controller). When instructed by the communication interface 20, the network extension 44 intercepts the network traffic 26 into and/or out of the electronic device 12. The network extension 44 either passes, drops, or redirects the intercepted network traffic 26.

The software 18 may also include a management subapplication 50 that is configured to receive operating instructions 52 (e.g., via the communication interface 20) from a management device 54. In this way, the management subapplication 50 is in electronic and data communication with the management device 54 (e.g., management servers). The operating instructions 52 may identify at least one of the trusted DNS source 30 or the secondary trusted DNS source 40 and may additionally identify a selected DNS protocol 28. For example, the management subapplication 50 may be an application installed on the electronic device 12 (e.g., stored in the memory 16) and executed by the processor 28. As an example, the management device 54 may be a computer used by an administrator to set DNS behavior for a number of electronic devices (e.g., smart phones issued by a company to employees).

In one embodiment, the management subapplication 50 (e.g., executed by the processor 28) activates the communication interface 20, which in turn activates the network extension 44 controlled by the communication interface 20. The network extension 44 intercepts the network traffic 26. The intercepted network traffic 26 is analyzed to determine the DNS traffic 24 included in the network traffic 26, as well as any DNS queries 32 included in the DNS traffic 24. The DNS queries 32 are then routed to the trusted DNS source 30 using the selected DNS protocol 28.

The on-device network protection software 18 may also analyze DNS traffic 24 to detect changes in the DNS traffic 24 signifying potential malware located on the device 12. The device 12 may notify a user of potential malware in any suitable manner. For example, the device may display a notification indicating that potential malware has been detected and may also display the rationale for this determination (e.g., DNS traffic being routed through a DNS server associated with malware). As another example, a browser or window associated with the application responsible for the suspicious DNS traffic may be directed to a special block page. The administrator may customize the content and graphics of the block page, and determine operations other than block, such as Inform and Ask, allowing the user to decide and justify access. As still another example, the device may send an audit report to a centralized management device, over a network and list the incident within the application.

In one embodiment, the software 18 includes a notification subapplication that notifies a user of the electronic device 12 of security incidents. For example, the notification subapplication may inform the user that suspicious DNS traffic has been detected. The notification subapplication may also send an audit report to the management device 54 listing the incident.

The circuitry 22 may have various implementations. For example, the circuitry 22 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 22 may be located on one or more discrete and separate pieces of hardware (e.g., the communication interface 20 and the processor 28). The circuitry 22 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the circuitry 22. The circuitry 22 may be communicatively coupled to the computer readable medium and communication interface through a system bus, mother board, or using any other suitable structure known in the art.

The memory 16 may be any suitable computer readable medium, such as one or more of a buffer, a flash memory, a hard drive, a removable media, a volatile memory, a non-volatile memory, a random-access memory (RAM), or other suitable device. In a typical arrangement, the memory 16 may include a non-volatile memory for long term data storage and a volatile memory that functions as system memory for the processor 16. The memory 16 may exchange data with the circuitry 22 over a data bus. Accompanying control lines and an address bus between the memory 16 and the circuitry 22 also may be present. The memory 16 is considered a non-transitory computer readable medium.

The communication interface 20 may be any suitable device for sending and receiving network traffic including DNS traffic. For example, the communication interface 20 may comprise a wireless network adaptor, an Ethernet network card, or any suitable device that provides an interface to a network. The communication interface 20 may be communicatively coupled to the computer readable medium, such that the communication interface 20 is able to send data stored on the computer readable medium across the network and store received data on the computer readable medium 20. The communication interface 20 may also be communicatively coupled to the circuitry such that the circuitry is able to control operation of the communication interface 20. The communication interface 20, computer readable medium, and circuitry may be communicatively coupled through a system bus, mother board, or using any other suitable manner as will be understood by one of ordinary skill in the art.

In one embodiment, the memory 16 stores the software 18 and an operating system (OS), such as Android® from Google or iOS® from Apple. As described above, the on-device DNS protection described herein may be performed using any electronic device and is not limited by operating system, applications running on the device, etc.

Figure 3:
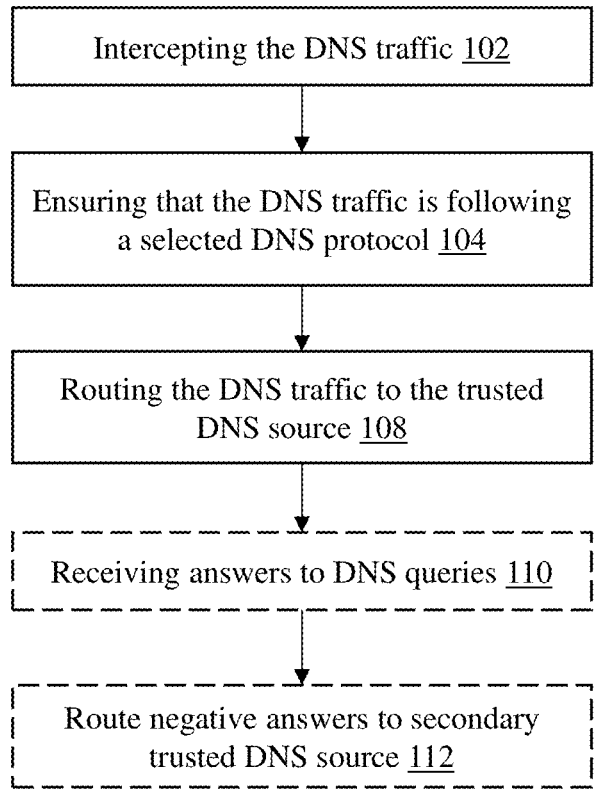
FIG. 3 is a flow diagram of an embodiment of a method for on-device securing of DNS traffic of an electronic device using a trusted DNS source.

Turning to FIG. 3, a method 100 is shown for on-device securing of DNS traffic 24 of an electronic device 12 using a trusted DNS source 30. In step 102, the DNS traffic 24 is intercepted before the DNS traffic 24 is transmitted by the communication interface 20 of the electronic device 12. As described above, the communication interface 20 sends and receives network traffic 26 of the electronic device 12 including the DNS traffic 24.

Figure 4:
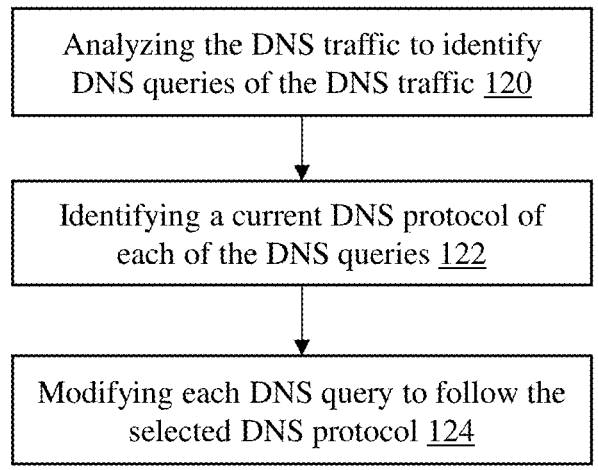
FIG. 4 is a flow diagram of an embodiment of a method for ensuring that the DNS traffic is following a selected DNS protocol.

In step 104, the circuitry 22 of the electronic device 12 is used to ensure that the DNS traffic 24 is following a selected DNS protocol 28. As shown in FIG. 4, ensuring that the DNS traffic 24 follows the selected DNS protocol 28, includes analyzing the DNS traffic to identify DNS queries 32 of the DNS traffic in step 120. In step 122, a current DNS protocol 33 of each of the DNS queries 32 is identified. In step 124, for each of the DNS queries 32 where the identified current DNS protocol 33 does not match the selected DNS protocol 28, the DNS query 32 is modified to follow the selected DNS protocol 28. As described above, a new DNS query may be generated from the original DNS query (e.g., by reading the unencrypted data stored in the original DNS query and encrypting this data in the new DNS query). This new DNS query may then be sent in place of the original DNS query. For example, when an answer to the new DNS query is received, the answer may be decrypted and supplied to the source of the DNS query (e.g., an application running on the electronic device 12) as an answer to the original DNS query.

Returning to FIG. 3, in step 108 the DNS traffic 24 is routed to the trusted DNS source 30 using the communication interface 20. In optional step 110, in response to each of the DNS queries 32 in the DNS traffic 24 that are routed to the trusted DNS source 30, an answer 34 to the DNS query 32 is received via the communication interface 20. As described above, the answer 34 comprises a positive answer specifying a destination associated with the DNS query 32, or a negative answer not specifying a destination associated with the DNS query 32. In optional step 112, when the received answer 34 is a negative answer, the DNS query 32 is routed to a secondary trusted DNS source 40 using the communication interface 20.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above-described processes including portions thereof can be performed by software, hardware, and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An electronic device for on-device securing of DNS traffic of the electronic device using a trusted DNS source, the electronic device comprising:
    a communication interface configured to send and receive network traffic including the DNS traffic;
    a memory storing on-device network protection software comprising machine executable instructions; and
    circuitry configured to execute the machine executable instructions of the software locally on the electronic device to secure the DNS traffic by:
        intercepting the DNS traffic before the DNS traffic is transmitted by the communication interface;
        ensuring that the DNS traffic is following a selected DNS protocol including:
            analyzing the DNS traffic to identify DNS queries of the DNS traffic;
            identifying a current DNS protocol of each of the DNS queries; and
            for each of the DNS queries where the identified current DNS protocol does not match the selected DNS protocol, replacing the DNS query in the DNS traffic with a new DNS query generated according to the selected DNS protocol based on data included in the DNS query; and
        routing the DNS traffic to the trusted DNS source.

2. The electronic device of claim 1, wherein the execution of the machine executable instructions of the software locally on the electronic device to secure the DNS traffic by the circuitry further includes:
    in response to each of the DNS queries in the DNS traffic that are routed to the trusted DNS source:
        receiving an answer to the DNS query, wherein the answer comprises a positive answer specifying a destination associated with the DNS query, or a negative answer not specifying a destination associated with the DNS query;
        when the received answer is a negative answer, routing the DNS query to a secondary trusted DNS source.

3. The electronic device of claim 2, wherein:
    the electronic device is connected to a local network via the communication interface; and
    the DNS query is associated with a computer device located on the local network.

4. The electronic device of claim 3, wherein the secondary trusted DNS source is a router or server located on the local network.

5. The electronic device of claim 2, wherein the positive answer specifies an internet protocol (IP) address of the DNS query.

6. The electronic device of claim 1, wherein:
    the software includes a network extension executed by the communication interface; and
    when executed by the communication interface, the network extension is configured to perform the intercepting of the DNS traffic before the DNS traffic is transmitted by the communication interface.

7. The electronic device of claim 6, further comprising an electronic processor, wherein:
    the circuitry includes the electronic processor;
    the software includes a management subapplication executed by the electronic processor;
    the management subapplication is configured to receive operating instructions from a management device via the communication interface; and
    the operating instructions include at least one of the selected DNS protocol or the trusted DNS source.

8. The electronic device of claim 7, wherein the management subapplication is further configured to activate execution of the software by the communication interface.

9. A system for securing DNS traffic included in network traffic, the system comprising:
    the electronic device of claim 7; and
    a management device configured to transmit the operating instructions to the electronic device.

10. The electronic device of claim 1, wherein the electronic device is implemented as a smartphone.

11. A method for on-device securing of DNS traffic of an electronic device using a trusted DNS source, the method comprising:
    intercepting the DNS traffic before the DNS traffic is transmitted by a communication interface of the electronic device, wherein the communication interface configured to send and receive network traffic of the electronic device including the DNS traffic;
    ensuring, using circuitry of the electronic device, that the DNS traffic is following a selected DNS protocol including:
        analyzing the DNS traffic to identify DNS queries of the DNS traffic;
        identifying a current DNS protocol of each of the DNS queries; and
        for each of the DNS queries where the identified current DNS protocol does not match the selected DNS protocol, replacing the DNS query in the DNS traffic with a new DNS query generated according to the selected DNS protocol based on data included in the DNS query; and
    routing the DNS traffic to the trusted DNS source using the communication interface.

12. The method of claim 11, further comprising:
in response to each of the DNS queries in the DNS traffic that are routed to the trusted DNS source:
  receiving an answer to the DNS query via the communication interface, wherein the answer comprises a positive answer specifying a destination associated with the DNS query, or a negative answer not specifying a destination associated with the DNS query;
  when the received answer is a negative answer, routing the DNS query to a secondary trusted DNS source using the communication interface.

13. The method of claim 12, wherein:
the secondary trusted DNS source is a router or server located on a local network that the electronic device is connected to; and
the DNS query is associated with a computer device located on the local network.

14. The method of claim 11, further comprising:
receiving operating instructions from a management device via the communication interface; and
the operating instructions including at least one of the selected DNS protocol or the trusted DNS source.

15. The method of claim 11, wherein the electronic device is embodied as a mobile phone.

16. A non-transitory computer readable memory having software embodied thereon for securing DNS traffic of an electronic device using a trusted DNS source when the software is executed locally by circuitry of the electronic device, wherein the executing of the software causes the electronic device to locally perform actions comprising:
  intercepting the DNS traffic before the DNS traffic is transmitted by a communication interface of the electronic device, wherein the communication interface configured to send and receive network traffic of the electronic device including the DNS traffic;
  ensuring, using circuitry of the electronic device, that the DNS traffic is following a selected DNS protocol including:
    analyzing the DNS traffic to identify DNS queries of the DNS traffic;
    identifying a current DNS protocol of each of the DNS queries; and
    for each of the DNS queries where the identified current DNS protocol does not match the selected DNS protocol, replacing the DNS query in the DNS traffic with a new DNS query generated according to the selected DNS protocol based on data included in the DNS query; and
  routing the DNS traffic to the trusted DNS source using the communication interface.

17. The memory of claim 16, further comprising:
in response to each of the DNS queries in the DNS traffic that are routed to the trusted DNS source:
  receiving an answer to the DNS query via the communication interface, wherein the answer comprises a positive answer specifying a destination associated with the DNS query, or a negative answer not specifying a destination associated with the DNS query;
  when the received answer is a negative answer, routing the DNS query to a secondary trusted DNS source using the communication interface.

18. The memory of claim 17, wherein:
the secondary trusted DNS source is a router or server located on a local network that the electronic device is connected to; and
the DNS query is associated with a computer device located on the local network.

19. The memory of claim 16, further comprising:
receiving operating instructions from a management device via the communication interface; and
the operating instructions including at least one of the selected DNS protocol or the trusted DNS source.

20. The memory of claim 16, wherein the electronic device is embodied as a mobile phone.

\* \* \* \* \*